Oct. 2, 1956    R. P. APPLEGATE    2,765,141
SHOCK AND VIBRATION BASE MOUNT
Filed June 19, 1953
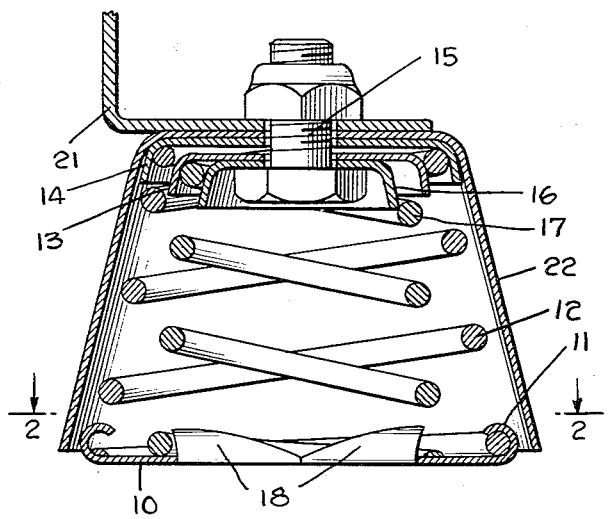
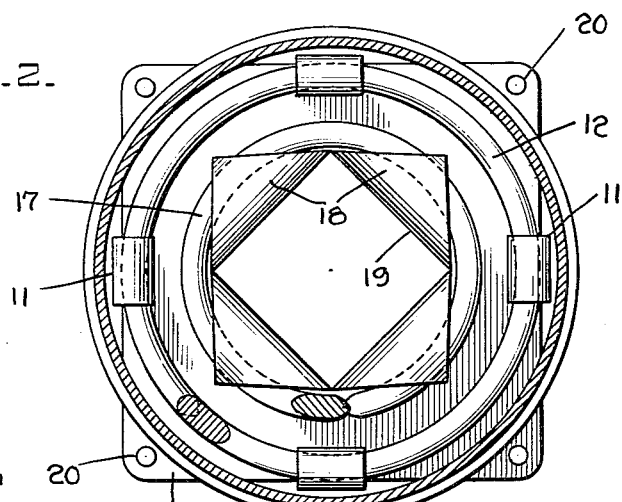
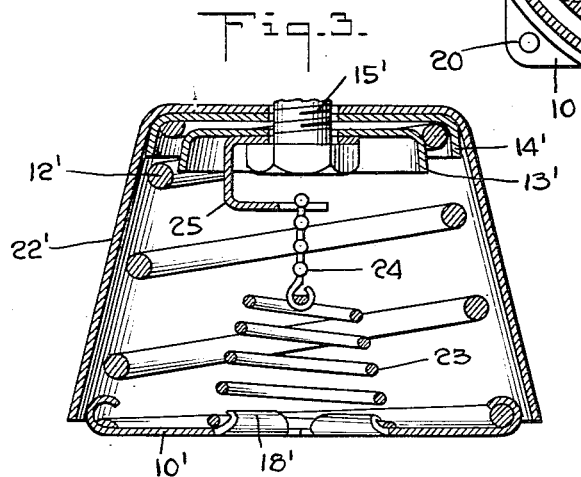
INVENTOR
RAYMOND P. APPLEGATE
BY
ATTORNEY United States Patent Office 2,765,141
Patented Oct. 2, 1956

2,765,141

SHOCK AND VIBRATION BASE MOUNT

Raymond P. Applegate, Hicksville, N. Y., assignor of one-half to Charles P. Molla, New Hyde Park, N. Y.

Application June 19, 1953, Serial No. 362,793

4 Claims. (Cl. 248—358)

This invention relates to what is commonly referred to as base mounts, used in the support of various types and kinds of apparatus where, in the handling, shipment and/or use, it is essential to provide means for eliminating or dispensing with shock or vibration in transmission to the mechanism.

Still more particularly, the invention deals with a vibration mount of the type and kind under consideration wherein maximum deflection is provided, stability maintained and, still further, wherein a tension spring is included in the mount to preload the compression spring, and still further, wherein both springs are of conical construction to provide the maximum amount of deflection in the use of the mount.

The novel features of the invention will be best understood from the following description, when taken together with the accompanying drawing, in which certain embodiments of the invention are disclosed and, in which, the separate parts are designated by suitable reference characters in each of the views and, in which:

Fig. 1 is a sectional view through a base mount made according to my invention;

Fig. 2 is a section on the line 2—2 of Fig. 1; and

Fig. 3 is a view similar to Fig. 1 showing only part of the construction and showing a modification.

My improved mount comprises a base plate 10 which is generally rectangular in form and has on its four sides lugs 11 which are adapted to be bent over the bottom coil of a main or outer compression frusto-conical spring 12, so as to fixedly secure this spring to the base plate. The conical spring 12 is coned upwardly, as seen, and the upper coil of the spring is fixedly secured between two conical inner and outer nesting cups 13 and 14, both cups being apertured to receive a mounting bolt 15, the latter being also used to draw the cones 13 and 14 into coupling engagement with the spring 12.

Also mounted on the bolt 15 is a small diameter conical cup 16, between which and the cone 13 is supported the upper end of an inner frusto-conical tension spring 17, the lower flared end of the spring 17 being fixedly secured to the base plate 10 by a plurality of outwardly bent lugs 18 fashioned from the central portion of the plate 10. These outwardly bent lugs 18 form a rectangular aperture 19 in the center portion of the plate, as will be apparent. Corner portions of the base plate 10 are also preferably provided with small apertures 20 for reception of fastening devices for securing same to a support.

In Fig. 1 of the drawing, I have indicated at 21 part of a mounting bracket for the mechanism to be supported by the mount, the bracket being engaged by the bolt 15, as will be apparent. At 22 I have shown a cup, preferably of molded flexible plastic or other material, the cup being substantially conical in form and being adapted to envelop substantially the entire mechanism of the mount, it being apparent that the walls of the cup 22 will flex in actuation of the mount in compensation for shock and vibration to which the mount may be subjected. The cup 22 forms a protecting housing for the mount, preventing foreign particles from entering the mount.

By providing the conical springs, it will be apparent that these springs provide a definite support for the apparatus in maintaining stability thereof; in other words, swaying of the apparatus is automatically checked by these conical springs. Furthermore, the conical springs, by virtue of the fact that they will nest within themselves, will provide maximum deflection, thus taking up the greatest amount of shock and vibration, this in contrast to conventional coil springs where the striking of adjacent coils minimizes the degree of deflection and are further unsatisfactory from the standpoint of capacity of shock absorption.

By utilizing the inner tension spring, the outer compression spring can be placed under a preload, further increasing the properties of the mount, and again this spring acts as a snubber or dampener to counteract the natural frequency period of vibration. In other words, the tension spring will tend to check a harmonic vibration that would otherwise be set up in resisting the normal action of the compression spring.

It will be apparent that in some uses of the device, the inner tension conical spring as well as the inner cup need not be employed, as the outer compression spring in itself is sufficient to perform the desired operation in mounts of various types and kinds. The inner tension spring is utilized primarily when it is desirable to preload the compression spring to a slight degree, and also in providing the snubbing action, checking resonance of a vibratory motion to which the supported article might be subjected.

In Fig. 3 of the drawing, I have shown a slight modification in which 10' represents a base plate generally similar to the plate 10, but the central portion only of the plate being shown, to illustrate the outwardly bent lugs 18' for coupling the modified frusto-conical tension spring 23 with the plate. The spring 23 differs from the spring 17 in being made shorter, and instead of being coupled with the upper cone structure the spring has a beaded or other flexible chain 24 coupled therewith, the latter having at its upper end a plate coupling 25 which is engaged by the bolt 15'.

Cups 13' and 14' similar to the cups 13 and 14 are employed to secure the upper end of the frusto-conical compression spring 12' in position, and at 22' is shown part of the cup or housing for enclosing the mechanism of the mount. It will be understood that the spring 12' has a coupling with peripheral edge portions of the plate 10' the same as with the structure shown in Fig. 1 of the drawing. The spring 23 acts substantially in the same manner as the spring 17, with the exception that in compression of the spring 12' beyond the limited action of the spring 23, the chain 24 will collapse. On the other hand, on the recoil or rebound the spring 23 will function as means to check or snug the action of the spring 12'. The spring 23 through the chain 24 will provide the slight preload on the spring 12' as with the structure shown in Fig. 1.

Having fully described my invention, what I claim as new and desire to secure by Letters Patent is:

1. A base mount device, comprising a sheet metal baseplate, a frusto-conical compression spring fixed to the baseplate with its contracted end directed upwardly, a pair of apertured cup-shaped sheet metal cones of different dimensions fitting one within the other, the upper contracted end of the spring being arranged between said cones, a supported member, a mounting bolt arranged in the apertures of said cones securing the device in connection with said supported member, said bolt holding said cones in clamping engagement with said end of said spring, and a cup of flexible material having an inwardly directed flange arranged and secured between one of said cones and said supported member and enveloping said spring and cones.

2. A base mount device, comprising a sheet metal baseplate, a frusto-conical compression spring fixed to the baseplate with its contracted end directed upwardly, a pair of apertured cup-shaped sheet metal cones of different dimensions fitting one within the other, the upper contracted end of the spring being arranged between said cones, a supported member, a mounting bolt arranged in the apertures of said cones securing the device in connection with said supported member, said bolt holding said cones in clamping engagement with said end of said spring, a frusto-conical tension spring disposed within the compression spring, means on the baseplate securing the lower end of the tension spring thereto, and a third apertured cup-shaped sheet metal cone fitting within one of said first named cones and through which said bolt passes securing the upper end of said tension spring between said one first named cone and said third cone.

3. A base mount device, comprising a sheet metal baseplate, a frusto-conical compression spring fixed to the baseplate with its contracted end directed upwardly, a pair of apertured cup-shaped sheet metal cones of different dimensions fitting one within the other, the upper contracted end of the spring being arranged between said cones, a supported member, a mounting bolt arranged in the apertures of said cones securing the device in connection with said supported member, said bolt holding said cones in clamping engagement with said end of said spring, a frusto-conical tension spring disposed within the compression spring, means on the baseplate securing the lower end of the tension spring thereto, a third apertured cup-shaped sheet metal cone fitting within one of said first named cones and through which said bolt passes securing the upper end of said tension spring between said one first named cone and said third cone, the means securing the tension spring to the baseplate comprising outwardly turned lugs bordering a central aperture in said baseplate, means securing the compression spring to said baseplate comprising inturned lugs at spaced intervals on and integral with the periphery of said baseplate, and a cup of flexible material arranged and secured between the first named cones and the supported member and housing said springs and cones.

4. A base mount device comprising a sheet metal baseplate, a frusto-conical compression spring fixed to the baseplate with its contracted end directed upwardly, a pair of apertured nesting cup-shaped sheet metal cones, the upper contracted end of the spring being arranged between said cones, a supported member, a mounting bolt arranged in the apertures of said cones securing the device in connection with said supported member, said bolt holding said cones in clamping engagement with said spring, a frusto-conical tension spring disposed within said compression spring, means on the baseplate securing the lower end of the tension spring thereto, and flexible means fixed to said bolt and upper end of the tension spring to preload the compression spring and to act as means checking action of said compression spring in the use of said mount.

References Cited in the file of this patent

UNITED STATES PATENTS

| | | |
|---|---|---|
| 1,006,789 | Prouty | Oct. 24, 1911 |
| 1,266,231 | Dottl | May 14, 1918 |
| 1,486,295 | Mullen | Mar. 11, 1924 |
| 2,044,023 | Trott | June 16, 1936 |
| 2,079,346 | Golden | May 4, 1937 |
| 2,222,146 | Jonsson | Nov. 19, 1940 |
| 2,507,806 | Mortimer | May 16, 1950 |

FOREIGN PATENTS

| | | |
|---|---|---|
| 333,525 | Italy | Dec. 3, 1935 |